United States Patent Office 3,500,183
Patented Mar. 10, 1970

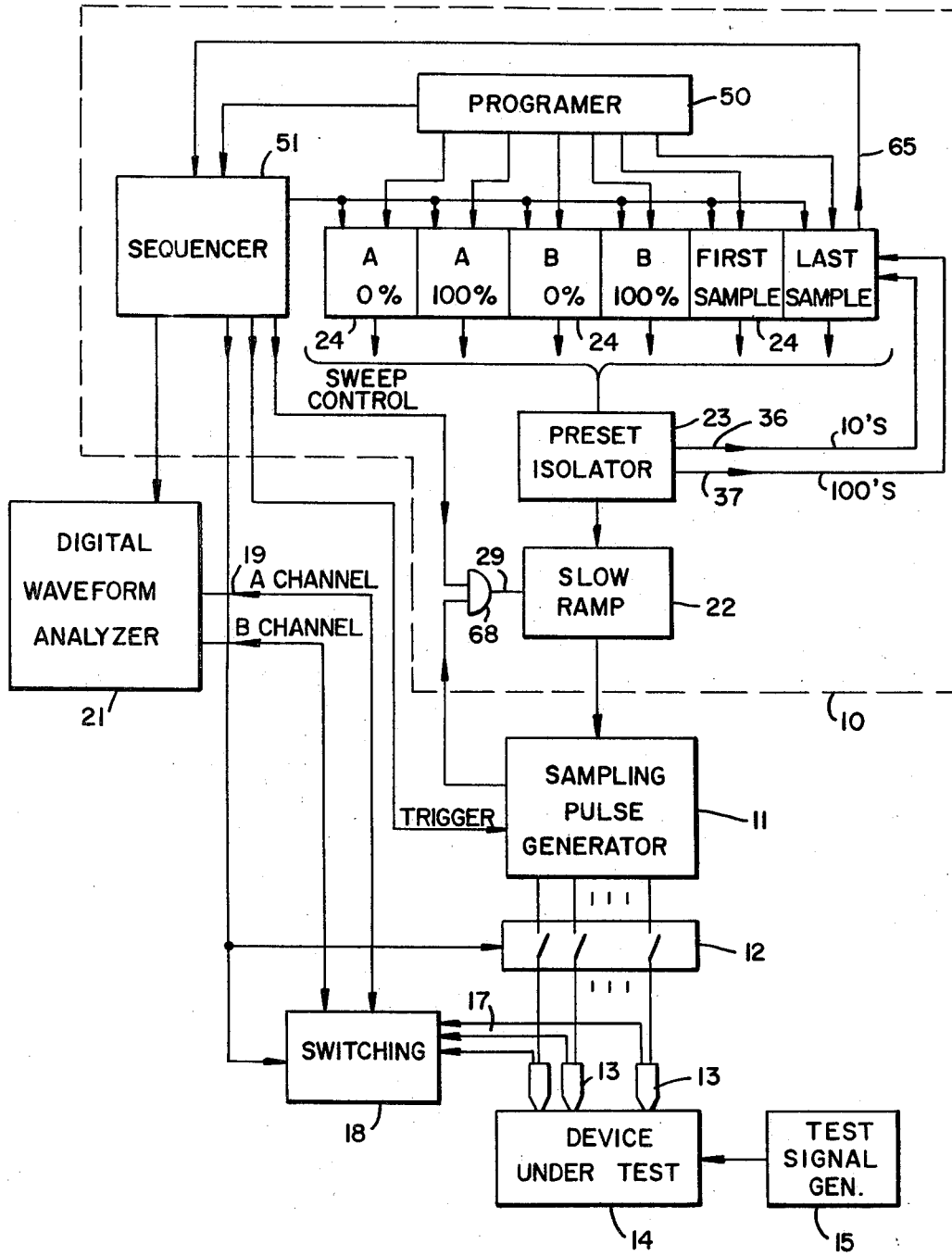

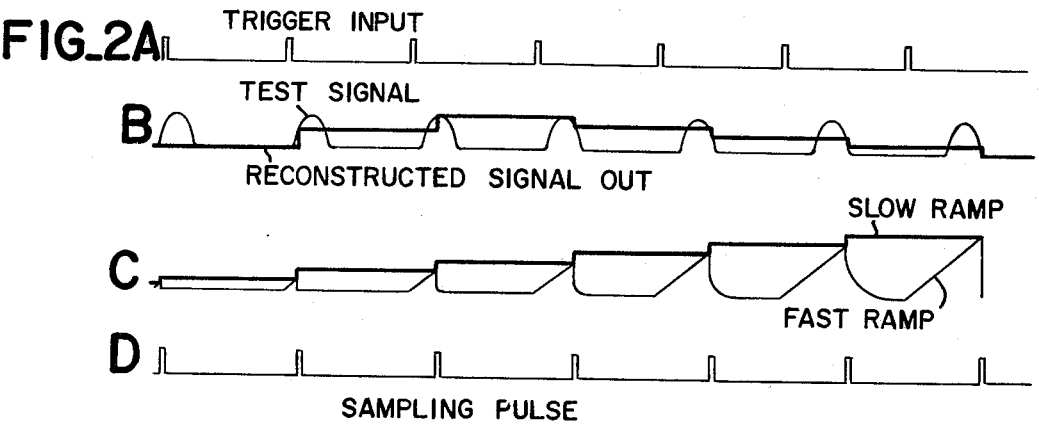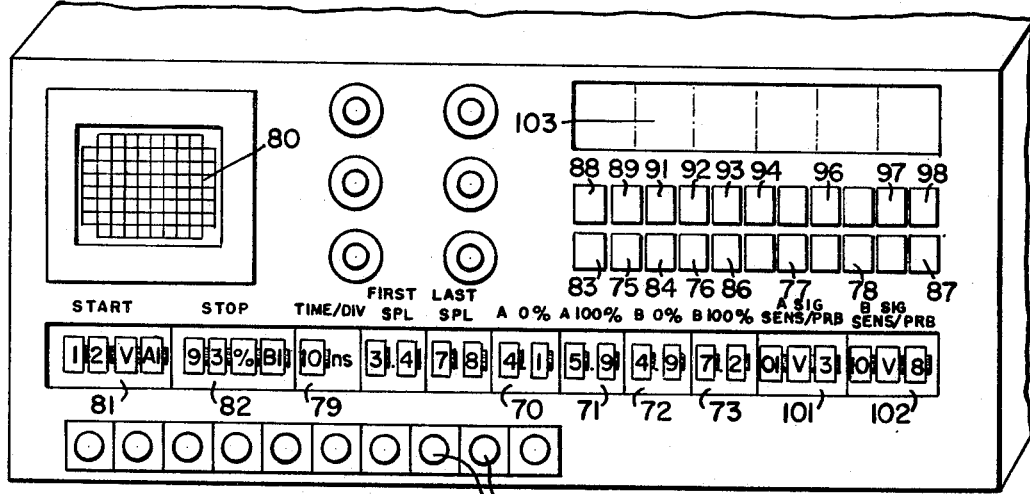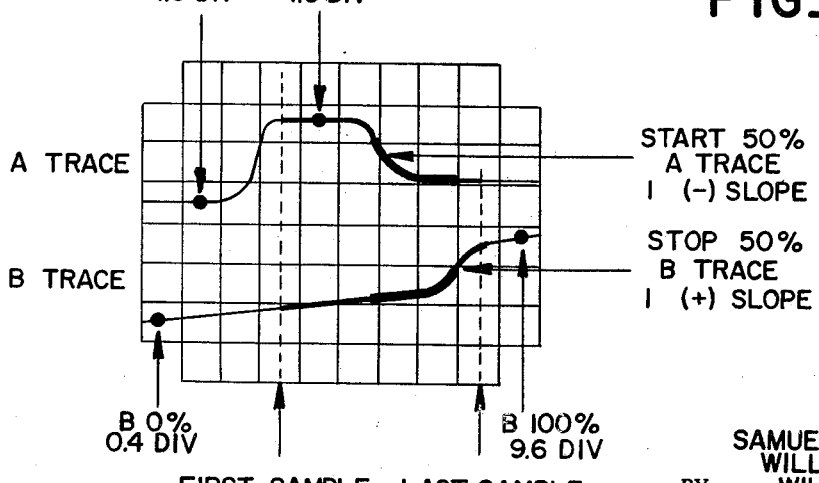

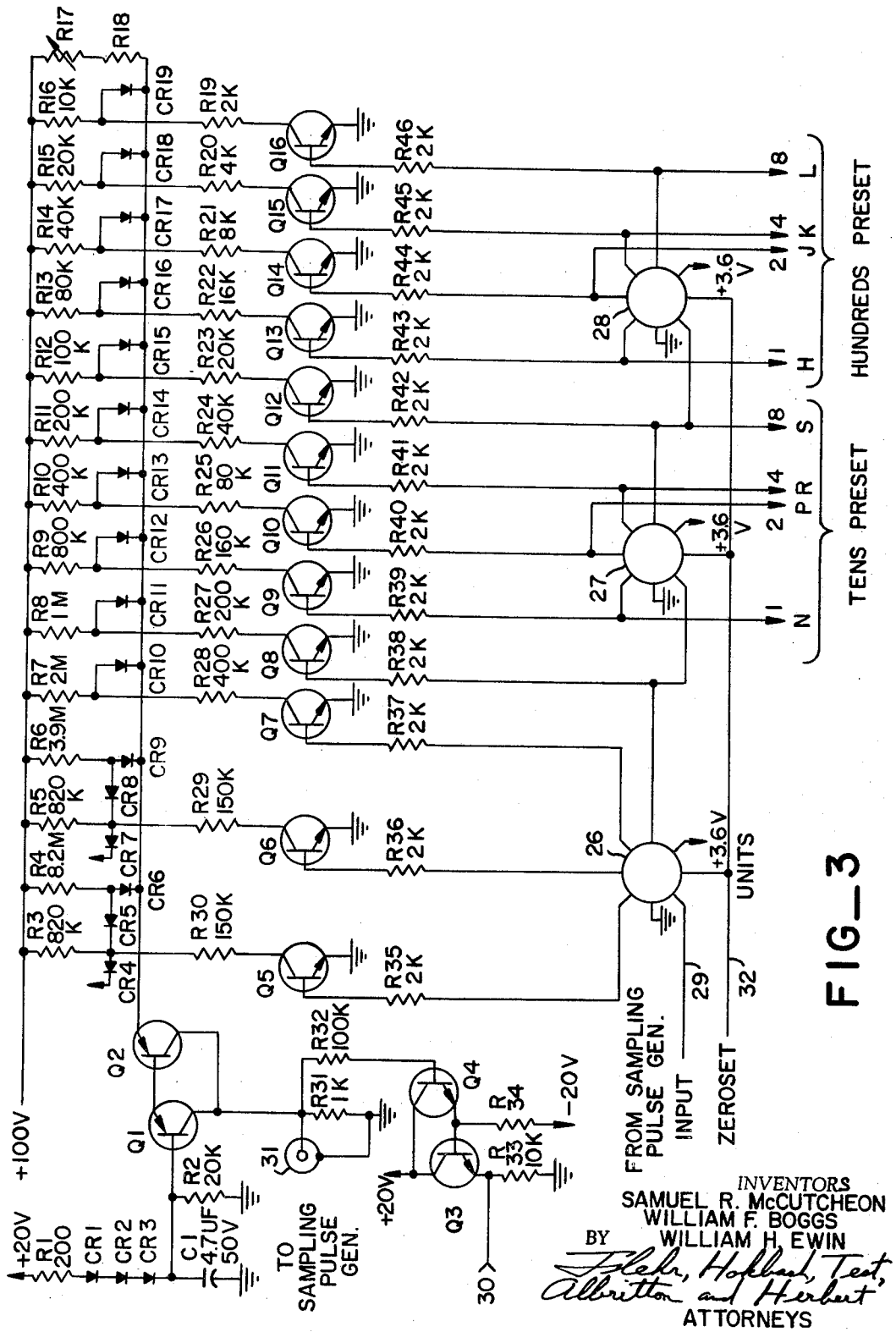

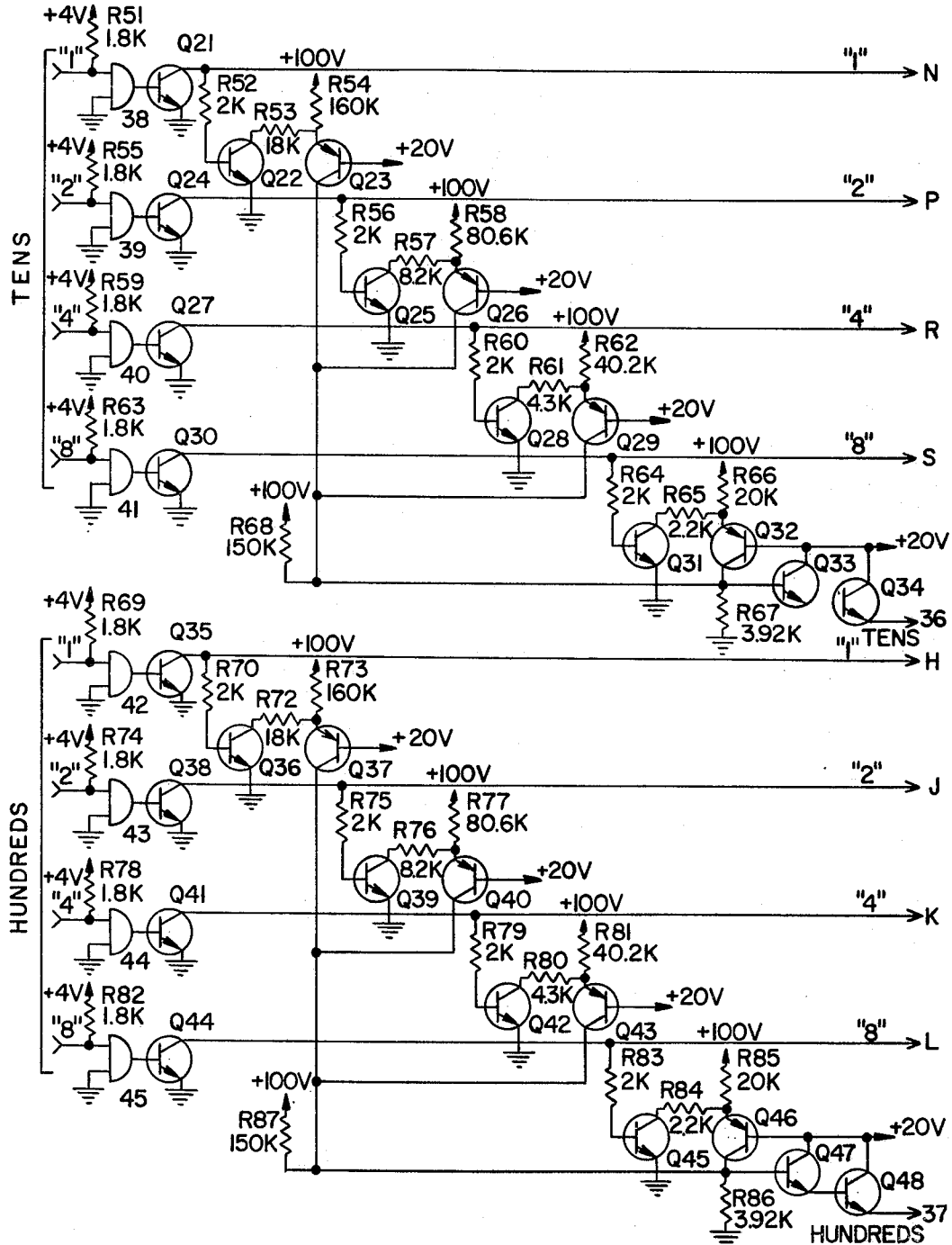
FIG_4

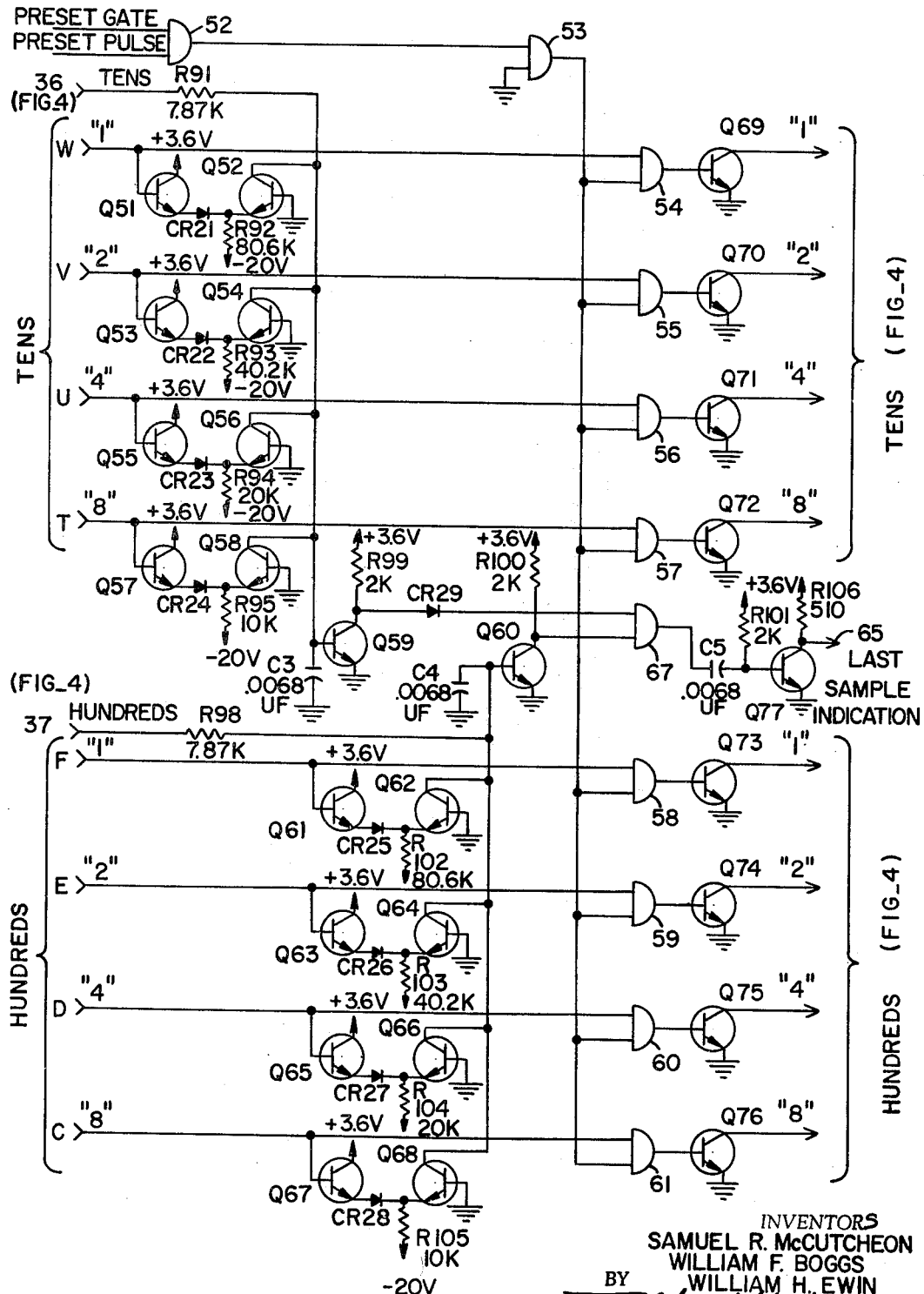
FIG_5

3,500,183
PRESETTABLE SAMPLING SYSTEM
Samuel R. McCutcheon, Saratoga, William F. Boggs, Fremont, and William H. Ewin, Los Altos, Calif., assignors to Automated Measurements Corporation, Los Gatos, Calif., a corporation of California
Filed Dec. 12, 1966, Ser. No. 600,830
Int. Cl. G01r 27/04, 23/10, 27/02
U.S. Cl. 324—57          1 Claim

ABSTRACT OF THE DISCLOSURE

A sampling system for sampling periodic test waveforms from an electronic device under test in which a single sampling pulse may be produced at a predetermined time to sample a single recurrence of the test waveform at any desired portion.

---

The present invention is directed to a sampling system and more specifically to a system in which test signal waveforms from an electronic component under test are sampled.

In a typical sampling process, with each repetition of a signal, the circuit measures one point or sample at a time a little later than the last sample. This process of advancing the sampling time in fixed increments is called strobing. A reconstructed signal, much slower than the original signal, is then reproduced, for example on a cathode ray oscilloscope, as an amplitude versus time point-to-point graph. Normally in such a system automatic reference zones are provided at, for example, the minimum and maximum or 0%, 100% values of a test waveform. This allows the referencing of significant amplitude test signal waveform data such as rise time which is the elapsed time between the 10% and 90% amplitude points of the waveform.

Normally the entire test signal waveform is reconstructed on a point by point basis to obtain the required reference information; namely, the 0% and 100% points. Thereafter the entire waveform is again reconstructed many times in order to obtain more specific detailed information concerning the test waveform as for example rise time. This multiplicity of reconstruction in both the obtaining of the reference zones and the actual analyzing of the waveform is time consuming and redundant. In fact in production testing where thousands of electronic components may be processed through a single testing station, the testing time required by present sampling systems is prohibitive for any reasonable production use.

In such systems much of the test data is redundant, since depending on the particular testing application only a portion of the test waveform may have to be reconstructed to obtain desired detailed information. For example, in the case of the rise time only the leading edge of the waveform would be useful.

It is therefore a general object of the invention to provide an improved sampling system which obviates the above defects.

It is another object of the invention to provide an improved sampling system which eliminates redundancies in the testing procedure thereby facilitating production testing of electronic components.

It is another object of the invention to provide a sampling system in which the entire test signal waveform need not be reconstructed to obtain the appropriate reference zones.

It is another object of the invention to provide a system of the above character in which only a predetermined portion of a waveform need be reconstructed and such portion is easily varied.

Additional objects of the invention will appear in the following description in which the preferred embodiment has been set forth in detail in conjunction with the accompanying drawings. Referring to the drawings:

FIGURE 1 is a block diagram of a sampling system embodying the invention;
FIGURES 2A, 2B, 2C and 2D are waveforms useful in understanding the invention;
FIGURES 3, 4, and 5 are detailed circuit diagrams of specific portions of FIGURE 1;
FIGURE 6 shows additional waveforms useful in understanding the invention; and
FIGURE 7 is a simplified plan view of the control panel of an instrument embodying the system shown in FIGURE 1.

In general the sampling system of this invention is used for sampling periodic test waveforms from electronic devices under test. It comprises means for presetting in time at least one sampling period with respect to a reference time. Thereafter, a pulse generator is responsive to the presetting means for sampling the test waveform at the preset time. More specifically several sampling periods can be preset and in addition a portion of the test waveform can be reconstructed between two preset limits.

Sampling time control apparatus of the present invention is generally used in conjunction with a system also disclosed in a concurrently filed application entitled Sampling System and Apparatus for Testing Electronic Devices, filed Dec. 12, 1966, Ser. No. 688,836 with the same inventors as the present application. The entire system is shown in FIGURE 1 where the sample time control apparatus is in the dashed blocked diagram 10 which performs the function of controlling the time at which sampling is done. Sample time controller 10 is coupled to a sampling pulse generator 11 whose function as described in the above copending application is to generate two pulses; a narrow pulse, a strobe or a sampling pulse, and a wide pulse which is a stretch gate or integrator gate pulse. These are fed through a switching device 12 to a number of probes 13 which are coupled to a device under test 14. A test signal generator 15 provides appropriate test signals to the device under test and a reconstructed waveform on an increased time base is provided on the output lines 17 of the probes 13 as discussed in the copending application. The reconstructed test signal is switched through a switching device 18 to A and B channels 19 to a digital waveform analyzer 21. The analyzer most commonly may include a cathode ray oscilloscope for displaying the reconstructed test waveforms and a digital readout device for indicating selected amplitude levels of the reconstructed test waveforms. Certain interconnections are made between the sampling time controller 10 and remaining components of the system which will be described in detail later.

In order to best understand the sample time control apparatus 10, three of its basic components will be first discussed in detail. These are a slow ramp circuit 22, a preset isolator 23, and preset and comparator printed circuit boards 24 which are labeled, A 0%, A 100%, B 0%, B 100%, first sample, and last sample; these printed circuit boards have substantially identical circuitry, and except for the "last sample" board, function similarly.

FIGURE 3 is a circuit schematic of the slow ramp 22 of FIGURE 1. In general the slow ramp circuitry performs two functions. First it serves as a digital to analog converter and secondly as a single direction presettable counter. More specifically micrologic elements 26, 27, and 28 are counting elements which internally have four flip-flop devices. They store the digital information inputs and also are interconnected so that an additional count on input 29 to the units counter 26 will be reflected in the 10's decade 27 and the 100's decade 28 if appropriate. The 10's and 100's decade micrologic elements 27 and 28 are presetable from the preset isolator 23 (FIGURE 1) through input terminals NPRS for element 27 and HJK for micrologic element 28. These input lines are labeled with the numbers 1, 2, 4, and 8 which are the respective equivalent decimal weightings of the lines. The units input 29 to element 26 comes from sampling pulse generator 11 (FIGURE 1) whose function will be explained below.

The output of the circuit of FIGURE 3 appears on a coaxial connector 31 which is coupled to the sampling pulse generator 11 (FIGURE 1). This output is a voltage which is proportional to the actual count in micrologic units 26, 27, and 28.

Referring now more specifically to the details of the circuit of FIGURE 3 the digital to analog converter includes transistors Q5 through Q16 which acts as switches for the currents from resistors R4 and R6 through R16 into the common bus which is at the emitter of a transistor Q2. When a transistor such as Q16 is turned on, the division ratio between R16 and R19 is such that diode CR19 is back biased. Therefore is contributes no current to the common bus. However when Q16 is turned off, its input impedance to its collector is substantially infinite from a DC standpoint and current from R16 now flows through diode CR19 which goes into the common bus amplifier stage Q1, Q2.

The base of Q1 is held at approximately a positive 20 volts and since the other side of resistor R16 is kept at a constant positive 100 volts there is a constant or precision current metered into transistor Q2. Resistors R4 and R6 through R16 are weighted in value to reflect the digital count contained in micrologic units 26 through 28 with which each of these resistors is associated. Thus, for example, R16 is a 10,000 ohm resistor and with 80 volts across it there will be 8 milliamperes flowing into Q2; similary with R15 there will be 4 milliamperes and with R14, 2 milliamperes.

Digital counts are stored in micrologic elements 26, 27, 28 by grounding the proper input. In the case of, for example, the 100's preset, grounding of the L terminal, places ground on the base of transistor Q16 making it non-conductive to provide a precision current to the emitter of Q2 and the output connector 31. Thus if the counters are allowed to run in sequence a staircase of current will occur at the emitter of Q2.

Amplifier stage Q1, Q2 is a Darlington type stage which has a very high gain. The amount of current coming out of the Q1 stage is very small compared to the current going into the Q2 stage. Therefore, substantially all of the current going into the emitter of Q2 comes out of the common collectors of Q1 and Q2 which then goes through R31 to produce the output at connector 31. The purpose of the Darlington pair is to maintain the positive 20 volt input voltage constant. Otherwise, the output staircase would begin to sag with increased loading.

Similarly transistors Q3 and Q4 form another Darlington type emitter-follower pair which have an output 30 at the emitter of Q3 which is coupled to a deflection amplifier for the sweep circuit of a cathode ray oscilloscope tube of the waveform analyzer. This isolates this load from the precision voltage output of connector 31.

Variable resistor R17 and series connected resistor R18 are coupled between the positive 100 voltage supply and the common input line to Q2 to provide a built-in offset voltage of approximately 1 volt. The purpose of this is to match the DC output level at connector 31 with the sampling pulse generator 11 level. In addition, transistors Q1 and Q2 are biased in a class A state for operation in the linear portion of the amplification curve.

The zero set input on line 32 which extends to micrologic units 26, 27 and 28 is for the purpose of resetting all of the counters to zero after each measurement and before new digital information is preset into it from the preset isolator 23.

The slow ramp preset isolator 23 is shown in greater detail in FIGURE 4 and includes outputs NPRS and HJKL which are coupled to the 10's preset and 100's preset of similarly lettered terminals of the slow ramp of FIGURE 3. The hundreds and tens input, as indicated on the left side of the drawing, is a summing junction for the printed circuit boards 24 (FIGURE 1). Two other outputs are tens and hundreds voltage staircases on terminals 36 and 37 respectively which as shown in FIGURE 1 extend to the "last sample" printed circuit board 24.

The circuit of FIGURE 4 accomplishes two functions; first as a preset isolator and second as a relatively rough digital to analog converter. The first function as mentioned above is as a summing junction for all of the preset circuits 24; in other words each of the tens and hundreds inputs of the circuit form a junction for six separate inputs from the printed circuit cards 24. Transistors Q21, Q24, Q27, Q30, Q35, Q38, Q41 and Q44 are respectively coupled to the four "tens" and four "hundreds" input of the circuit and have coupled to their collectors the outputs to the slow ramp micrologic circuits. If an input is indicated their output collectors are grounded thereby storing the appropriate count or presetting the appropriate count in the micrologic elements 27 and 28. Logic elements 38 through 45 are coupled between the tens and hundreds input and the above-mentioned transistors and serve as inverters.

A preset count of tens and hundreds is stored in the micrologic elements of FIGURE 3 by the selective grounding of pins NPRS and HJKL by the activation in FIGURE 4 of transistors Q21, Q24, Q27, and Q30 in the case of then tens count and transistors Q35, Q38, Q41 and Q44 in the case of the hundreds count. These transistors act as switches which when closed, ground their respective collectors which as discussed above stores a selected count in the associated micrologic elements 27 and 28.

The preset isolator also includes a digital to analog converter to convert a digital input to analog information which is a stairstep type of voltage. The conversion is similar to that of FIGURE 3 and includes the transistors Q22 through Q34 for a tens "staircase" which has an output at pin 36 and transistors Q36 through Q48 for a hundreds "staircase" which has an output at pin 37. The currents which are summed are for example, in the case of the tens staircase having an output on line 36, derived from a resistor R54 coupled to Q23, R58 coupled to Q26, R62 coupled to the emitter of Q29 and R66 which is coupled to the emitter of Q32. The collectors of all of these transistors are joined together and form a base input to transistor Q33 which with transistor Q34 forms an output amplifier for line 36.

In operation, when the transistors Q21, Q24, Q27, and Q30 are in their normal non-conductive condition, Q22, for example which is coupled to the collector of Q21, will be conducting bringing the emitter of Q23 down to a voltage less than its base voltage thus placing Q23 in a cut off condition. This contributes no current to the node which goes to the base of Q33. However, activation of Q21 which would place a one count in the associated tens micrologic element 27 (FIGURE 3) makes Q22 non-conductive and the current in R54 now goes through on transistor Q23 to the node of the base of Q33. The amount of current will be the voltage difference across resistor R54 which is one hundred volts minus 20 volts divided by the 160K value resistor. The subsequent stages have correspondingly fractional values of resistance, for example R58, has a value of approximately one-half of that R54, to thus form a digital to analog converter.

As discussed above the inputs to the preset isolator are 6 sets of paralleled lines which are outputs of the preset and comparator printed circuit boards 24 (FIGURE 1). The detailed circuit schematic of one of these boards is shown in FIGURE 5. All of the boards are identical except for the "last sample" board which has a slight functional difference which will be explained.

As inputs to each of boards 24 there is a programmer 50 which determines the preset values to be set into each circuit board. The programming may be accomplished by front panel controls on the instrument or by remote digital programming. A Sequencer 51 (FIGURE 1) is provided which is coupled to both programmer 50 and other components of the system which control the sequence of operation. Operation of this will be described in conjunction with the operation of the system as a whole.

Now, referring to the schematic of FIGURE 5 which is the "last sample" printed circuit board 24, digital inputs from the programmer of tens and hundreds are indicated in the case of the tens count of the lines WVUT in the case of the hundreds count on lines CDEF. These lines are also labeled with their equivalent decimal count. The output of the lines extends to the preset isolator of FIGURE 4 as indicated and are in parallel with the other printed circuit boards 24.

Sequencer 51 insures that only one printed circuit board is active at any one time. This gating is indicated as the preset gate and preset pulse inputs which extend from the programmer 50 and 51 into an "AND" gate 52 through an inverter gate 53 and thence to "AND" output gates 54 through 62 which have their outputs coupled into the base input of output transistors Q69 through Q76. These in turn have their collector outputs coupled to the preset isolator of FIGURE 4. The other input of "AND" gates 54 through 62 are the tens and hundreds input terminals WVUT and FEDC respectively.

Thus far, in operation a preset input from programmer 50 is placed into the tens and hundreds input of FIGURE 5 which will then through the "AND" gates 54 through 62 cause selected transistors Q69 through Q76 to given a certain count indication. The remainder of the circuitry of FIGURE 5 is used only in the "last sample" printed circuit card for the purpose of detecting when the counter of the slow ramp 22 (FIGURE 3) progresses to the last sample point. The last sample point is also programmed by programmer 50 and is similar to a preset sampling point. Inputs to the last sample circuit are lines 36 and 37 from FIGURE 4 which are the tens and hundreds staircases respectively. Generally the circuit of FIGURE 5 compares this input to the preset last sample input and when this point is reached an output last sample indication is produced at the collector 65 of transistor Q77. This output, as indicated in FIGURE 1, is coupled into the sequencer 51 to reset the sequencer to start another cycle of operation.

Referring now more specifically to the last sample indication of FIGURE 5, a digital to analog conversion of the preset input count of the tens and hundreds terminals, WVUT and FEDC, is provided in the case of the tens count by transistors Q51 through Q58 which feed into a common node at the base of Q59, the collector ouput being an analog or stairstep voltage representation of the digital input. Similarly transistors Q61 through Q68 convert the hundreds digital count to an analog stairstep which is found at the node at the base input of transistor Q60. The above transistors, in addition to serving as analog to digital converters are also comparators. The staircase current on the tens input line 36 from FIGURE 4 is continuously compared to the current flowing to the base of Q59 from the analog to digital converter transistors. If this current is greater than the current through R91 and line 36, transistor Q59 will be cut off. However, if the current through line 36 and R91 is greater than the current contributed by the four transistors Q52, Q54, Q56 and Q58 than transistor Q59 will be turned on; the on condition of transistor Q59 in conjunction with a similar on condition of comparator transistor Q60 indicates that a comparison has occurred. In other words, this indicates that the preset input count to the tens and hundreds terminal is equal to the actual count on the counter of the slow ramp (more specifically digital micrologic units 26, 27, and 28 of FIGURE 3). The collectors of Q59 and Q60 are coupled into an "AND" gate 67 which is coupled through a capacitor C5 to the base input of output transistor Q77 to indicate the last sample.

OPERATION

The waveforms of FIGURES 2A through 2D are useful in understanding the general operation of the apparatus and system of the present invention. The system is initiated by the trigger pulse of FIGURE 2A to the sampling pulse generator 11 (FIGURE 1) which comes from the sequencer 51. This initiates a fast ramp (FIGURE 2C) which is a standard feature of a sampling pulse generator. This is an internally generated voltage in the pulse generator and termination of this ramp by an input from the slow ramp 22 determines when a strobe or sampling pulse of FIGURE 2D is generated. As indicated on the drawing the input from the slow ramp which is the sample time control voltage is a stairstep voltage whose magnitude determines when the fast ramp is cut off. At this point the sampling pulse (FIGURE 2D) is generated. Bceause of the stairstep characteristic of the slow ramp of FIGURE 2C this means that each sample is taken at a progressively later time. FIGURE 2B illustrates how under certain operating conditions a test signal is sampled by the sampling pulse of FIGURE 2D at progressively later times to produce a reconstructed test signal output as more fully described in the concurrently filed application.

In reconstructing a full test signal or a portion of a test signal the slow ramp circuit 22 generates its stairstep slow ramp voltage which is an input to the sampling pulse generator 11 by means of the micrologic counters. Each count represents one step of the output slow ramp voltage. The feedback of this sampling pulse into "AND" gate 68 (FIGURE 1), which couples into line 29, adds another count and then another step on the slow ramp voltage. In this manner, progressively later sampling pulses are generated. This mode of operation is controlled by the sweep control output of sequencer 51.

However, in accordance with the invention, the above sequence where a portion of the wave is reconstructed occurs only during the sequence of the first sample to the last sample which indicates the length of the reconstructed portion of the test signal. In the case of acquiring reference zone information such as the A 0%, A 100%, B 0% and B 100%, the slow ramp counters are preset to a specific count at the desired reference zone percentage. In other words, the slow ramp does not advance automatically but rather causes a generation of a sampling pulse at a single point on the test signal curve to obtain the desired information. Thus the counters 27 and 28 (FIGURE 5) of the slow ramp 22 are set only to the desired values. The sequencer 51 then automatically steps to the next function; for example, A 100% and thereafter B 0% and B 100% to thus obtain the necessary reference information for the reconstructing of the waveform which is done between the first sample and the last sample operations.

In actual practice several samples are taken, for example at the A 0% point, before sequencing to the next point to be sampled. This is for data accuracy. By means of programmer 50 any of these A or B operations may be omitted.

In the prior art the obtaining of this information required 5 to 10 reconstructed waveforms which used as much as 100 milliseconds in testing time. The present device, because of its capability of presetting the sampling period times, requires only 40 microseconds. This is almost two orders of magnitude less than the prior art measurement time. In other words, the present invention provides a novel measurement system in which a minimum of wasted or redundant information is generated.

Reconstructing the entire waveform in order to obtain the A 0% and A 100% and B 0% and B 100% information produced data which was totally unnecessary. In the present invention the only data which is generated is that which is absolutely necessary.

The generation of redundant data is also prevented in the case where the test signal waveform is reconstructed from the first sample to the last sample point. Because of the ability of the slow ramp to be preset to any value, the full waveform of the test signals need not be generated. For example if there is a voltage transition that occurs on 10% of the sweep then the programmer 50 can be adjusted so that only 10% of the total time or approximately 1 millisecond may be used in looking at it.

Application of the above concepts is illustrated on a sample display on a monitoring oscilloscope of a waveform analyzer as shown in FIGURE 6. The oscilloscope is part of the control panel of the instrument as shown in FIGURE 7. This control panel and the associated apparatus includes in addition to the sample time controller 10 shown in FIGURE 1 digital waveform analyzer 21, sampling pulse generator 11, and the switching circuits 12 and 18.

Referring to the waveforms of FIGURE 6, a trace and B brace are indicated which correspond to the A channel and B channel input to the digital waveform analyzer 21. The dots on the A trace indicate that the A 0% information was desired at 1.5 divisions on the scope output and the A 100% information at 4.6 division on the scope output. Similarly the B 0% is at .4 divisions and B 100% at 9.6 divisions. These two digit division indications correspond to the tens preset and hundreds preset of the slow ramp 22.

In operation the sequencer causes sampling pulses to be generated only at these four points to first obtain the appropriate zero and one hundred percent data. Thereafter the "first sample" which has been preset to 3.5 divisions determines the initiation point where the waveform is to be reconstructed and the preset last sample at 8.6 divisions determines the termination. Again, only the portion of the waveform which is of importance has been reconstructed. The actual display on the oscilloscope is determined by the start and stop controls and in the case of FIGURE 6 is shown as heavy lines where the start of the display is at 50% of the A trace at the first negative slope and the stop occurs at 50% of the B trace at the first positive slope.

The control panel of FIGURE 7 illustrates how this various information is preset into the unit. It should be kept in mind that this programming may be achieved either by setting the dials on the front of the control panel or remotely by a digital input.

More specifically, the manual A and B percent inputs are dials and readouts 70–73 respectively, which are in the long horizontal band at the bottom of the control panel, and indicate presets of 4.1, 5.9, 4.9, and 7.2 respectively. After setting the dials the A 0% signal push button 75 is pressed which will cause a sampling pulse to be generated at the preset A 0% point; viz, at 4.1 divisions. It should be kept in mind that all of these buttons are correlated with the sequencer so that if for example the A 0% data is not wanted the sequencer will immediately go to the next point which may be A 100% function, if the A 100% signal button 76 is pressed. There are also B 0% signal and B 100% signal push buttons 77 and 78.

For choosing how much of the waveform is to be reconstructed the first sample and last sample dials are preset at for example 3.4 and 7.8 divisions. The time per division dial setting 79 which is now set to 10 nanoseconds per division sets the scale on the oscilloscope display 80 of the waveform analyzer and also the scale of the information placed in the A and B percent data points and the first and last sample point. The start and stop dial settings 81, 82 refer to the actual display on the oscilloscope 80 as explained in conjunction with FIGURE 6. Six control knobs next to the oscilloscope display screen are typical controls for a scope.

The remaining push buttons in the lower row are A 0% reference level 83 which grounds the probe tip through appropriate switches to some ground reference level or any other desired level and serves as a 0% reference level instead of that of the signal.

The A 0% negative peak push button 84 gives a selection and storage of the most negative voltage on the waveform. The A 100% positive peak push button 86 stores the most positive voltage on the waveform between the first sample and last sample times. The same is true for the B trace.

The digital average push button 87 is used in the case of a noisy environment where each point of information is averaged four times before advancing to the next information to be taken.

Referring to the top row of push buttons the waveform time push button 88 places the device into a time mode. The DVM A 0% to A 100% button 89 allows the measurement of the voltage between the A 0% and A 100% points on the display trace. DVM is an abbreviation for digital volt meter. The same is true of the DVM B button 91 which is for the B trace. The DVM one volt full scale and ten volt full scale, 100 full scale and the 1000 volt full scale push buttons 92, 93, 94 are for a built-in digital volt meter, to allow for voltage measurements when needed. DVM times 10 resolution button 96 converts the previous digital volt meter readings from a 4 digit accuracy to a 3 digit accuracy. This allows the volt meter readings to be taken in 1/10 of the time because of the lower resolution required. The last two push buttons 97 and 98 are for calibration purposes of the input waveforms for the probes. The probe connections are shown as the nine pin connectors 99 on the front panel. Only two probes are active at any one time and this is determined by a probe selection driver as more fully explained in the concurrently filed application.

Dial switches 101 and 102 labeled A signal sensitivity/probe and B signal sensitivity/probe allow different attenuations to be switched which are contained in the probes. For example the A signal sensitivity per probe is set to control probe number 3 with a .01 volt/division attenuation range. This may also be achieved by remote programming.

Lastly the upper right rectangular portion 103 of the control panel provides a digital readout of any appropriate information.

Thus, in summary the present invention has provided a sampling time control apparatus and system which eliminates redundancy in the testing procedure thereby greatly facilitating production testing of electronic components. This form of redundancy removal is accomplished by the provision of sampling at preset periods to obtain a certain reference amplitude information. Another form of redundancy elimination is that only the portion of the waveform which is of interest must be reconstructed.

We claim:

1. In a sampling system for sampling periodic test waveforms from an electronic device under test; a sampling pulse generator for producing sampling pulses for sampling said waveforms; sampling time control apparatus including, a plurality of printed circuit boards for receiving preset counts said boards including reference information boards for obtaining 0% and 100% test waveform data and first and last sample boards for reconstructing the test waveform between two limits in time, preset isolator means coupled to and serving as a summing junction for said plurality of circuit boards for storing the preset count of said boards, slow ramp means including digital counter means which may be controllably preset to a single predetermined count and responsive to said preset count stored in said isolator means for presetting the digital counter means said slow ramp means being responsive to a sampling of a test waveform for incrementing said digital counter means, said isolator means also being responsive to said incrementing for increasing the stored digital count of said isolator means, said slow ramp means also including digital to analog converter means for converting the count of said digital counter means to analog information for application to said sampling pulse generator said sampling pulse generator being responsive to the magnitude of such analog information for producing one or more sampling pulses at a predetermined time in accordance with said analog magnitude for a recurrence of said periodic test waveform; said last said last sample board including means responsive to a comparison between said stored count to said isolator means and the preset count of said sample board to signal termination of said test waveform reconstruction, probe means coupled to said device under test and responsive to said sampling pulses for sampling a test waveform; and a digital waveform analyzer coupled to said probe means for receiving and analyzing said waveform samples.

References Cited

UNITED STATES PATENTS 3,423,677   1/1969   Alford et al. _____ 324—73

EDWARD E. KUBASIEWICZ, Primary Examiner

U.S. Cl. X.R.

324—77, 121; 328—151, 186